(12) United States Patent
Kikuchi et al.

(10) Patent No.: US 8,376,008 B2
(45) Date of Patent: Feb. 19, 2013

(54) RUN-FLAT TIRE

(75) Inventors: Naohiko Kikuchi, Kobe (JP); Kazuo Hochi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 894 days.

(21) Appl. No.: 12/224,334

(22) PCT Filed: Apr. 25, 2007

(86) PCT No.: PCT/JP2007/058957
§ 371 (c)(1),
(2), (4) Date: Aug. 25, 2008

(87) PCT Pub. No.: WO2007/129580
PCT Pub. Date: Nov. 15, 2007

(65) Prior Publication Data
US 2009/0020203 A1    Jan. 22, 2009

(30) Foreign Application Priority Data
May 9, 2006    (JP) .................................. 2006-130394

(51) Int. Cl.
*B60C 1/00*    (2006.01)
*B60C 17/00*    (2006.01)

(52) U.S. Cl. .................... 152/458; 152/517; 152/539
(58) Field of Classification Search .............. 152/525, 152/458, 516, 517, 520; *B60C 13/00*
See application file for complete search history.

(56) References Cited

U.S. PATENT DOCUMENTS

| | | | | |
|---|---|---|---|---|
| 3,954,131 | A | * | 5/1976 | Hoshino et al. ............... 152/517 |
| 5,707,462 | A | * | 1/1998 | Kikuchi et al. ............ 152/209.1 |
| 5,753,365 | A | * | 5/1998 | Morimoto et al. ............ 428/357 |
| 2001/0018944 | A1* | | 9/2001 | Mizuno ......................... 152/547 |
| 2004/0019135 | A1 | | 1/2004 | Horiguchi et al. |
| 2006/0060284 | A1* | | 3/2006 | Zanzig et al. ................. 152/525 |
| 2006/0169378 | A1 | | 8/2006 | Akiyama |
| 2006/0231186 | A1 | | 10/2006 | Minami et al. |

FOREIGN PATENT DOCUMENTS

| | | |
|---|---|---|
| CN | 1418781 A | 5/2003 |
| CN | 1473871 A | 2/2004 |
| CN | 1767959 A | 5/2006 |
| JP | 7-32828 A | 2/1995 |
| JP | 11-348512 A | 12/1999 |
| JP | 2004-249888 A | 9/2004 |
| JP | 2005-280459 A | 10/2005 |
| JP | 2005-280534 A | 10/2005 |
| JP | 2006-192927 A | 7/2006 |
| JP | 2006-199190 A | 8/2006 |

* cited by examiner

*Primary Examiner* — Justin Fischer
*Assistant Examiner* — Philip N Schwartz
(74) *Attorney, Agent, or Firm* — Birch, Kolasch & Birch, LLP

(57) ABSTRACT

The present invention provides a run-flat tire that can improve both of ride quality and run-flat performance. The run-flat tire of the present invention comprises a sidewall-reinforcing layer prepared by using a rubber composition comprising non-metallic short fibers having an average fiber diameter of 1 to 100 μm and an average fiber length of 0.1 to 20 mm in an amount of 5 to 120 parts by weight on the basis of 100 parts by weight of a diene rubber, the non-metallic short fibers being oriented in the circumferential direction of the tire.

6 Claims, 1 Drawing Sheet

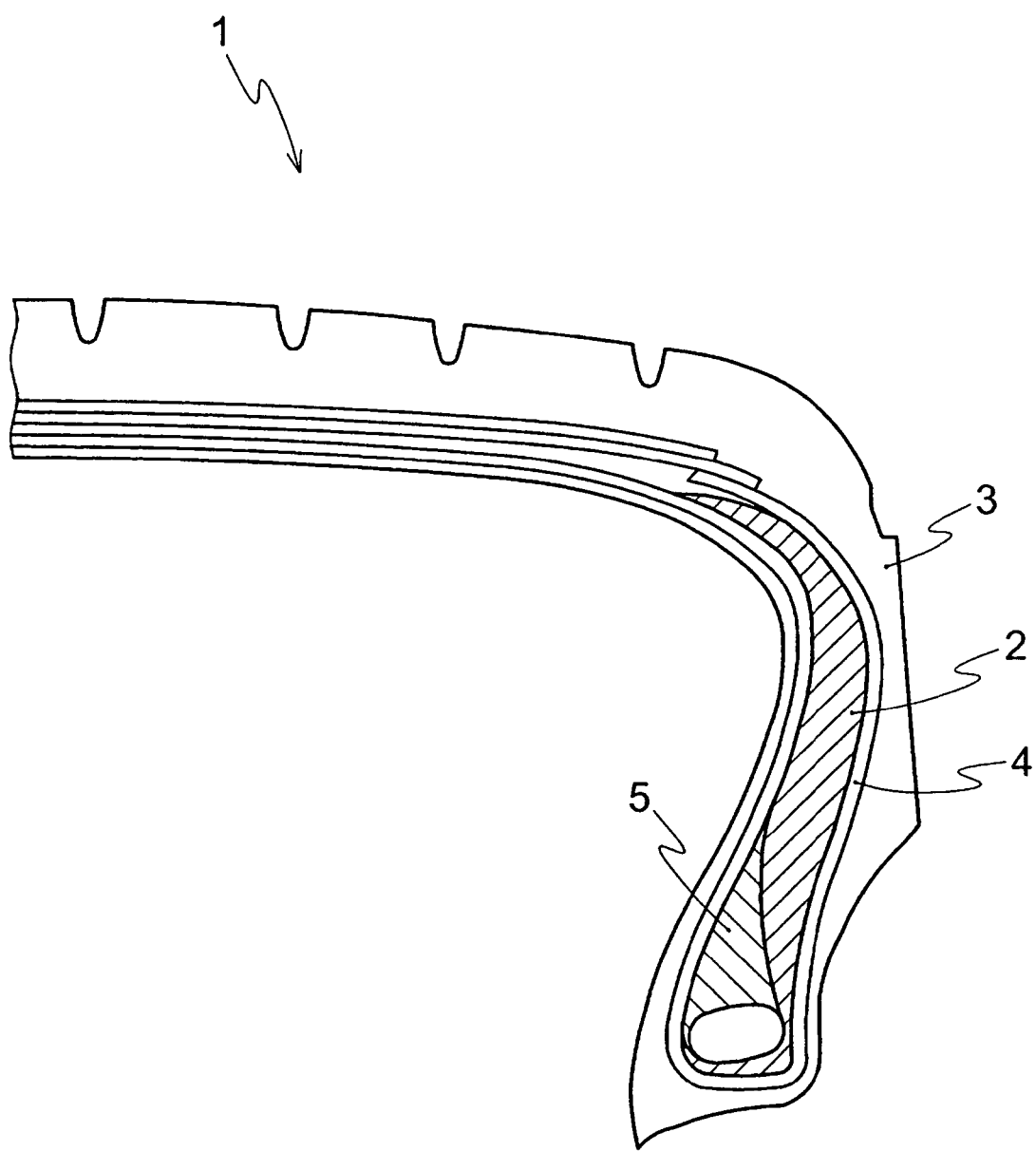

RUN-FLAT TIRE

TECHNICAL FIELD

The present invention relates to a run-flat tire.

BACKGROUND ART

At present, a run-flat tire having a side reinforcing layer (a reinforcing layer) with high strength arranged at an inside of a sidewall portion is practically used. The tire keeps rigidity even if it is in a state (inner pressure is zero) in which an air pressure is lost by a puncture, and damage of a rubber is reduced even if it is subject to repeated bending, thus enabling a vehicle to run a certain distance. Thereby, there is no necessity of always having a spare tire ready and weight saving in the whole vehicle can be expected. However, there are limits in a speed and a distance in running a run-flat tire at its puncture. Therefore, a further improvement of durability of the run-flat tire (run-flat durability) is desired.

As a method of improving durability of the run-flat tire, a method of suppressing deformation by thickening a reinforcing layer and preventing fracture by the deformation is mentioned. However, since the weight of the tire is increased, the method runs contrary to the weight saving which is the initial purpose of the run-flat tire.

Further, there is also a method of increasing amounts of reinforcing fillers such as carbon black and enhancing hardness of a rubber for reinforcement to suppress deformation. However, load on a kneader at steps such as kneading and extrusion is increased and since heat build-up of a rubber composition after vulcanization is increased, an improvement of the run-flat durability cannot be expected.

In JP2005-280534A, there is disclosed a run-flat tire in which vibration of the tire is reduced by making the tire have a reinforced rubber layer prepared by a specific method, and the run-flat performance is improved by using a rubber composition containing specified amounts of a specific rubber component, carbon black and silica. However, the run-flat tire is not adequate in the run-flat performance and reduction of tire vibration because it does not contain non-metallic short fibers.

DISCLOSURE OF INVENTION

It is an object of the present invention to provide a run-flat tire capable of improving both of ride quality and run-flat performance.

The present invention relates to a run-flat tire having a sidewall-reinforcing layer prepared by using a rubber composition comprising 5 to 120 parts by weight of non-metallic short fibers with an average fiber diameter of 1 to 100 μm and an average fiber length of 0.1 to 20 mm based on 100 parts by weight of a diene rubber, the non-metallic short fibers being oriented in the circumferential direction of the tire.

It is preferable that the sidewall-reinforcing layer satisfies the following equations:

$E1 \geq 12$ MPa $E1/E2 \geq 1.5$ $E2''/(E2)^2 \leq 7.0 \times 10^{-9}$ Pa$^{-1}$ wherein E1 is a complex modulus in the circumferential direction of the tire, and E2 and E2'' are a complex modulus and a loss modulus in the radial direction of the tire, respectively, and each of E1, E2 and E2'' is measured at 70° C.

The aforementioned non-metallic short fiber is preferably a glass fiber or a carbon fiber.

BRIEF DESCRIPTION OF DRAWING

FIG. 1 is a partially sectional view of the run-flat tire having a side portion-reinforcing rubber layer of the present invention.

BEST MODE FOR CARRYING OUT THE INVENTION

The rubber composition used for a run-flat tire of the present invention includes a diene rubber and non-metallic short fibers.

Examples of the diene rubber are a natural rubber (NR), isoprene rubber (IR), butadiene rubber (BR), butadiene rubber containing syndiotactic 1,2-polybutadiene crystals (SPB-containing BR), styrene-butadiene rubber (SBR), acrylonitrile-butadiene rubber (NBR), chloroprene rubber (CR), styrene-isoprene-butadiene rubber (SIBR), styrene-isoprene rubber and isoprene-butadiene rubber. These may be used alone and two or more of these may be used in combination. Among these, from the viewpoint of a superior bending fatigue resistance, NR and/or BR are preferable and a combination of NR and BR is more preferable.

As for NR, conventionally used NR of grades such as RSS#3 and TSR 20 can be used.

When NR is contained, a content of NR in the rubber component is preferably not less than 20% by weight, more preferably not less than 30% by weight. When the content of NR is less than 20% by weight, processability tends to be deteriorated. Further, the content of NR is preferably not more than 80% by weight, more preferably not more than 70% by weight. When the content of NR exceeds 80% by weight, a heat resistance and a bending fatigue resistance tend to be lowered.

As for BR, SPB-containing BR is preferable from the viewpoint of high hardness and a superior low heat build-up property.

A content of SPB in SPB-containing BR is preferably not less than 1% by weight, more preferably not less than 5% by weight. When the content of SPB is less than 1% by weight, there is a tendency that adequate rigidity is not obtained. Further, the content of SPB is preferably not more than 25% by weight, more preferably not more than 20% by weight. When the content of SPB exceeds 25% by weight, durability tends to be lowered because a syndiotactic component forms coagulation in polybutadine.

When BR is contained, a content of BR in the rubber component is preferably not less than 20% by weight, more preferably not less than 30% by weight. When the content of BR is less than 20% by weight, the bending fatigue resistance tends to be lowered. Further, the content of BR is preferably not more than 80% by weight, more preferably not more than 70% by weight. When the content of BR exceeds 80% by weight, processability tends to be lowered.

Examples of the non-metallic short fibers are non-metallic inorganic short fibers such as a glass fiber and a carbon fiber and non-metallic organic short fibers such as a rayon fiber, an acrylic fiber, a polyester fiber, a nylon fiber, an aromatic polyamide fiber, a urethane fiber and an aramid fiber. These non-metallic short fibers may be used alone and two or more of these may be used in combination. Among these, a glass fiber is preferable because of high rigidity in both a tensile direction and a compression direction.

An average fiber diameter of the non-metallic short fibers is not less than 1 μm, preferably not less than 10 μm. When the average fiber diameter of the non-metallic short fibers is less than 1 μm, the sidewall-reinforcing layer cannot be thinned because the complex modulus is not improved, and thus ride quality cannot be improved. Further, the average fiber diameter of the non-metallic short fibers is not more than 100 μm, preferably not more than 50 μm. When the average fiber diameter of the non-metallic short fibers exceeds 100 μm, dispersibility of the non-metallic short fibers is deteriorated and adhesive force with the rubber is lowered.

An average fiber length of the non-metallic short fibers in the rubber is not less than 0.1 mm, preferably not less than 0.2 mm. When the average fiber length of the non-metallic short fibers in the rubber is less than 0.1 mm, an effect of improving rigidity in an orientation direction by containing the non-metallic short fibers is inadequate. Further, the average fiber length of the non-metallic short fibers in the rubber is not more than 20 mm, preferably not more than 10 mm. When the average fiber length of the non-metallic short fibers in the rubber exceeds 20 mm, dispersibility of the non-metallic short fibers is deteriorated.

A content of non-metallic short fibers is at least 5 parts by weight, preferably at least 10 parts by weight based on 100 parts by weight of the rubber component. When the content of non-metallic short fibers is less than 5 parts by weight, an effect of improving rigidity in an orientation direction by containing the non-metallic short fibers is inadequate. Further, the content of non-metallic short fibers is not more than 120 parts by weight, preferably not more than 100 parts by weight. When the content of non-metallic short fibers exceeds 120 parts by weight, processability is deteriorated.

In the rubber composition of the present invention, compounding agents, for example, reinforcing agents such as carbon black, stearic acid, zinc oxide, various antioxidants, vulcanizing agents such as sulfur, and a vulcanization accelerator which are conventionally used in the rubber industry can be suitably compounded in addition to the aforementioned rubber components and the non-metallic short fibers, as occasion demands.

The non-metallic short fibers are oriented in the circumferential direction of the tire in the sidewall-reinforcing layer so that a complex modulus in the circumferential direction of the tire can be improved, and run-flat performance can also be improved.

FIG. 1 is a partially sectional view of the run-flat tire of the present invention having a side portion-reinforcing rubber layer. The rubber composition for reinforcement of a side portion is used for a side portion reinforcing rubber layer 2 in a run-flat tire 1 as described in FIG. 1. The side portion reinforcing rubber layer 2 is arranged on a sidewall part 3, thereby enhancing rigidity of the tire. As for a form of the side portion reinforcing rubber layer 2, there is exemplified a crescent-shaped rubber layer which contacts with the inside of a carcass ply 4, is adjacent to a bead apex 5 and is arranged from a bead part to a shoulder part, in which a thickness of the rubber layer decreases gradually toward both ends.

The run-flat tire of the present invention can be also obtained by vulcanizing a sidewall-reinforcing rubber layer that is formed by winding rubber strips along the circumferential direction of the tire, in addition to molding a sidewall-reinforcing rubber member prepared by using an extruder. Specifically, unvulcanized rubber strips having a specific size in which the aforementioned non-metallic short fibers are oriented in one direction is prepared from a rubber composition optionally containing the aforementioned compounding agents according to requirement. Then, an unvulcanized sidewall-reinforcing layer is formed on the side face of unvulcanized carcass by spirally winding the rubber strip around the tire axis. Further, it is laminated with other tire member to form an unvulcanized tire and the run-flat tire of the present invention is obtained by vulcanizing the unvulcanized tire.

The non-metallic short fibers can be oriented in the circumferential direction of the tire by producing the run-flat tire of the present invention by the aforementioned method.

Width of the rubber strip is preferably not less than 0.5 cm, more preferably not less than 1 cm. When the width of the rubber strip is less than 0.5 cm, productivity tends to be inferior. Further, the width of the rubber strip is preferably not more than 5 cm, more preferably not more than 3 cm. When the width of the rubber strip exceeds 5 cm, uniformity of the sidewall-reinforcing layer tends to be inferior because it is difficult to form the sidewall-reinforcing layer with high precision.

A thickness of the rubber strip is preferably not less than 0.5 mm, more preferably not less than 1 mm. When the thickness of the rubber strip is less than 0.5 mm, productivity tends to be inferior. Further, the thickness of the rubber strip is preferably not more than 5 mm, more preferably not more than 3 mm. When the thickness of the rubber strip exceeds 5 mm, bumps between strips are enlarged and uniformity of the sidewall-reinforcing layer tends to be inferior.

In the run-flat tire of the present invention produced by the aforementioned production method, the non-metallic short fibers can be oriented in the circumferential direction of the tire. Thereby, elastic modulus can be improved and the sidewall-reinforcing layer can be thinned due to the improvement of the elastic modulus. Therefore, both of run-flat durability and ride quality can be improved.

A complex modulus ($E1$) in the circumferential direction of the tire in the sidewall-reinforcing layer of the run-flat tire of the present invention is preferably not less than 12 MPa, more preferably not less than 15 MPa, further preferably not less than 20 MPa. When $E1$ is less than 12 MPa, improvement of the run-flat performance tends to be inadequate. Further, $E1$ is preferably not more than 150 MPa, more preferably not more than 120 MPa. When $E1$ exceeds 150 MPa, flexibility of the sidewall portion is lost and ride quality tends to be deteriorated.

The complex modulus ($E2$) in the radial direction of the tire in the sidewall-reinforcing layer of the run-flat tire of the present invention is preferably not less than 8 MPa, more preferably not less than 10 MPa. When $E2$ is less than 8 MPa, rigidity necessary for run-flat running is not obtained and durability tends to be lowered. Further, $E2$ is preferably not more than 100 MPa, more preferably not more than 80 MPa. When $E2$ exceeds 100 MPa, flexibility of the sidewall portion is lost and ride quality tends to be deteriorated.

Further, it is preferable that $E1$ and $E2$ satisfy the following formula.

$$1.5 \leq E1/E2$$

$E1/E2$ is preferably not less than 1.5, more preferably not less than 1.8. When $E1/E2$ is less than 1.5, there is a tendency that it is difficult to simultaneously improve the run-flat durability and ride quality.

It is preferable that $E2$ and the loss modulus ($E2''$) in a radial direction of the sidewall-reinforcing layer in the sidewall-reinforcing layer of the run-flat tire of the present invention satisfy the following formula.

$$E2''/(E2)^2 \leq 7.0 \times 10^{-9} [\text{Pa}^{-1}]$$

$E2''/(E2)^2$ is preferably not more than $7.0 \times 10^{-9}$ Pa$^{-1}$, more preferably not more than $6.0 \times 10^{-9}$ Pa$^{-1}$. When $E2''/(E2)^2$ exceeds $7.0 \times 10^{-9}$ Pa$^{-1}$, there is a tendency that heat is easily generated by deformation at run-flat running and thermal degradation of the rubber is accelerated to be fractured.

Specifically, E1, E2 and E2" are measured, for example, by a method of cutting test pieces with a specified size from the sidewall-reinforcing layer and measuring them using a viscoelastic spectrometer manufactured by Iwamoto Seisakusyo K.K.

The thickness of the sidewall-reinforcing layer is preferably not less than 3 mm, more preferably not less than 4 mm. When the thickness of the sidewall-reinforcing layer is less than 3 mm, rigidity at run-flat running cannot be secured and durability tends to be lowered. Further, the thickness of the sidewall-reinforcing layer is preferably not more than 15 mm, more preferably not more than 12 mm. When the thickness of the sidewall-reinforcing layer exceeds 15 mm, the layer becomes heavy and ride quality tends to be lowered.

EXAMPLES

The present invention is explained in detail based on Examples, but is not limited only to these.

Here, various chemicals used in Examples and Comparative Examples are explained.

Natural rubber (NR): RSS#3
Butadiene rubber (BR): VCR412 (SPB-containing BR, content of SPB: 12% by weight, average particle diameter of SPB: 250 nm) available from Ube Industries Ltd.
Carbon black: DIABLACK E (N550) available from Mitsubishi Chemical Corporation
Glass fiber A: Microglas Chopped Strand (average fiber diameter: 33 μm, average fiber length: 6 mm) available from NSG VETROTEX K.K.
Glass fiber B: Microglas Chopped Strand (average fiber diameter: 11 μm, average fiber length: 6 mm) available from NSG VETROTEX K.K.
Carbon fiber: KUREKA CHOP C-106T (average fiber diameter: 18 μm, average fiber length: 6 mm) available from Kureha Corporation
Stearic acid: Stearic acid "TSUBAKI" available from NOF Corporation
Zinc oxide: ZINC OXIDE No. 2 available from Mitsui Mining & Smelting Co., Ltd.
Antioxidant: ANTIGENE 6C (N-(1,3-dimethylbutyl)-N'-phenyl-p-phenylenediamine) available from Sumitomo Chemical Co., Ltd.
Insoluble sulfur: MU-CRON OT available from Shikoku Chemicals Corporation
Vulcanization accelerator: NOCCELER NS (N-tert-butyl-2-benzothiazolylsulfenamide) available from OUCHI SHINKO CHEMICAL INDUSTRIAL CO., LTD.

Examples 1 to 4 and Comparative Examples 1 and 2

Chemicals other than sulfur and a vulcanization accelerator were kneaded according to the compounding prescription shown in Table 1 under the condition of 160° C. for 5 minutes using a Banbury mixer to obtain kneaded products. Then, insoluble sulfur and the vulcanization accelerator were added to the kneaded products and the mixture was kneaded under the condition of 120° C. for 2 minutes to obtain unvulcanized rubber compositions. Further, the unvulcanized rubber compositions were extruded into a tape shape with a width of 3 cm and a thickness of 1 mm. Then the obtained tape-shaped rubber compositions were spirally wound as a sidewall-reinforcing layer of a run-flat tire, and were laminated with other tire members to form unvulcanized tires. Then, run-flat tires (a size of 245/40ZR18) of Examples 1 to 4 and Comparative Examples 1 and 2 were produced by vulcanizing the unvulcanized tires by press under the condition of 165° C. for 20 minutes.

(Viscoelasticity Test)

Rubber test pieces with a specified size were cut out from the sidewall-reinforcing layers of the produced run-flat tires. A complex modulus (E1) in the circumferential direction of the tire, a complex modulus (E2) and a loss modulus (E2") in the radial direction of the tire were measured under the conditions of an initial strain of 10%, a dynamic strain of 1%, a frequency of 10 Hz and a temperature of 70° C. using a viscoelastic spectrometer manufactured by Iwamoto Seisakusyo K.K. Further, E1/E2 and E2"/(E2)$^2$ were calculated.

(Run-Flat Performance)

A run-flat tire was run on a drum at a speed of 80 km/h under an inner pressure of 0 kPa and each running distance until the tire was broken was measured. A run-flat performance index of Comparative Example 1 is referred to as 100 and running distance of each compounding was expressed by an index according to the following equation. The larger the run-flat performance index is, the more superior the run-flat durability is.

(Run-flat performance index)=(Running distance of each compounding)÷(Running distance of Comparative Example 1)×100

(Ride Quality)

Test tires are produced and attached on a vehicle. The vehicle was run on a test course and ride quality at running was evaluated. Here, evaluation was carried out with 10 points at maximum and evaluation values of three test drivers were averaged.

Evaluation results of the aforementioned tests are shown in Table 1.

TABLE 1

|  | Ex. | | | | Com. Ex. | |
|---|---|---|---|---|---|---|
|  | 1 | 2 | 3 | 4 | 1 | 2 |
| Amounts (part by weight) | | | | | | |
| NR | 70 | 70 | 70 | 70 | 70 | 70 |
| BR | 30 | 30 | 30 | 30 | 30 | 30 |
| Carbon black | 50 | 50 | 50 | 50 | 50 | 60 |
| Glass fiber A | 10 | — | — | — | — | — |
| Glass fiber B | — | 10 | — | — | — | — |
| Carbon fiber | — | — | 10 | 15 | — | — |
| Stearic acid | 2 | 2 | 2 | 2 | 2 | 2 |
| Zinc Oxide | 3 | 3 | 3 | 3 | 3 | 3 |
| Antioxidant | 1 | 1 | 1 | 1 | 1 | 1 |
| Insoluble sulfur | 5 | 5 | 5 | 5 | 5 | 5 |
| Vulcanization accelerator | 2 | 2 | 2 | 2 | 2 | 2 |
| Evaluation results | | | | | | |
| E1 (MPa) | 24.8 | 34.4 | 30.8 | 43.1 | 12.3 | 15.4 |
| E2 (MPa) | 12.5 | 13.2 | 13.5 | 14.1 | 12.1 | 15.0 |
| E1/E2 | 1.98 | 2.61 | 2.28 | 3.06 | 1.02 | 1.03 |
| E2"/(E2)$^2$ ($10^{-9}$ Pa$^{-1}$) | 6.2 | 5.8 | 5.7 | 5.6 | 5.9 | 5.1 |
| Run-flat performance index | 130 | 135 | 145 | 160 | 100 | 108 |
| Ride quality | 6.5 | 6.5 | 6.5 | 6 | 6.5 | 6 |

INDUSTRIAL APPLICABILITY

The run-flat tire of the present invention can improve both of ride quality and run-flat performance by having a reinforced rubber layer prepared from a rubber composition containing specified amounts of a diene rubber and specific non-metallic short fibers, the non-metallic short fibers being oriented in the circumferential direction of the tire.

The invention claimed is:

1. A run-flat tire comprising a sidewall-reinforcing layer, wherein said sidewall-reinforcing layer is prepared by using a rubber composition comprising non-metallic short fibers having an average fiber diameter of 1 to 100 µm and an average fiber length of 0.1 to 20 mm in an amount of 5 to 120 parts by weight on the basis of 100 parts by weight of a diene rubber, the non-metallic short fibers being oriented in the circumferential direction of the tire and the thickness of the sidewall-reinforcing layer being not less than 3 mm and not more than 15 mm, wherein said sidewall-reinforcing layer satisfies the following equation:

$$1.5 \leq E1/E2 \leq 3.06,$$

wherein E1 is a complex modulus in the circumferential direction of the tire, and E2 is a complex modulus in the radial direction of the tire, and each of E1 and E2 is measured at 70° C, and wherein the sidewall-reinforcing layer is a crescent-shaped rubber layer which contacts with the inside of a carcass ply, is adjacent to a bead apex and is arranged from a bead part to a shoulder part, in which a thickness of the rubber layer decreases gradually toward both ends, and a radially inner end of the crescent-shaped rubber layer extends radially inward of an upper surface of a bead core.

2. The run-flat tire of claim 1, wherein said sidewall-reinforcing layer satisfies the following equations:

$$E1 \geq 12 \text{ MPa};$$

and $$E2''/(E2)^2 \leq 7.0 \times 10^{-9} \text{ Pa}^{-1}$$

wherein $E2''$ is a loss modulus in the radial direction of the tire and is measured at 70° C.

3. The run-flat tire of claim 1, wherein the non-metallic short fiber is a glass fiber or a carbon fiber.

4. The run-flat tire of claim 1, wherein the diene rubber comprises 70 to 80% by weight of natural rubber and 20 to 30% by weight of butadiene rubber, wherein a content of syndiotaetic 1,2-polybutadiene crystals in the butadiene rubber is 1 to 25% by weight.

5. The run-flat tire of claim 2, wherein the non-metallic short fiber is a glass fiber or a carbon fiber.

6. The run-flat tire of claim 1, wherein the crescent-shaped rubber layer extends radially inward of a lower surface of the bead core so that the bead core is radially sandwiched between the crescent-shaped rubber layer and the bead apex.

* * * * *